(12) United States Patent
Baumann et al.

(10) Patent No.: US 7,875,094 B2
(45) Date of Patent: Jan. 25, 2011

(54) DUST FILTER DEVICE

(75) Inventors: Otto Baumann, Leinfelden-Echterdingen (DE); Hardy Schmid, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 12/065,142

(22) PCT Filed: Apr. 19, 2007

(86) PCT No.: PCT/EP2007/053823

§ 371 (c)(1),
(2), (4) Date: Feb. 28, 2008

(87) PCT Pub. No.: WO2007/141079

PCT Pub. Date: Dec. 13, 2007

(65) Prior Publication Data

US 2008/0209873 A1 Sep. 4, 2008

(30) Foreign Application Priority Data

Jun. 9, 2006 (DE) .................. 10 2006 026 768

(51) Int. Cl.
*B01D 46/00* (2006.01)
(52) U.S. Cl. .................. 55/385.1; 55/497; 55/501; 55/502; 55/521; 173/71; 173/73
(58) Field of Classification Search .......... 55/481, 55/497, 502, 503, 511, 492, 521, 493, 499, 55/500, 501, DIG. 31, 385.1, 346, 428, 459.1; 210/493.3, 493.5; 173/71, 73; 451/87, 88, 451/270, 354, 357, 451, 453, 456

See application file for complete search history.

(56) References Cited

U.S. PATENT DOCUMENTS

| 1,830,096 | A | * | 11/1931 | Dollinger | ............ | 55/500 |
| 3,505,795 | A | * | 4/1970 | Wurtenberg | ............ | 55/499 |
| 4,547,950 | A | * | 10/1985 | Thompson | ............ | 29/445 |
| 5,501,794 | A | * | 3/1996 | Van de Graaf et al. | ... | 210/493.3 |
| 5,531,892 | A | * | 7/1996 | Duffy | ............ | 210/493.1 |
| 5,674,302 | A | * | 10/1997 | Nakayama et al. | ............ | 55/385.3 |
| 5,679,122 | A | * | 10/1997 | Moll et al. | ............ | 55/497 |
| 5,792,229 | A | * | 8/1998 | Sassa et al. | ............ | 55/497 |
| 5,804,014 | A | * | 9/1998 | Kahler | ............ | 156/204 |
| 6,074,450 | A | * | 6/2000 | Raber | ............ | 55/497 |
| 6,780,217 | B1 | * | 8/2004 | Palmer | ............ | 55/502 |
| 6,986,799 | B2 | * | 1/2006 | Ham | ............ | 55/521 |
| 7,553,217 | B2 | | 6/2009 | Reich et al. | | |

FOREIGN PATENT DOCUMENTS

| CN | 2574758 | 9/2003 |
| CN | 1688412 | 10/2005 |
| DE | 28 35 181 | 1/1980 |

(Continued)

*Primary Examiner*—Duane Smith
*Assistant Examiner*—Minh-Chau Pham
(74) *Attorney, Agent, or Firm*—Michael J. Striker

(57) ABSTRACT

A dust filter, in particular, for hand-guided power tools, includes a plate filter (18) with at least one spreader (14) for spreading filter folds (16) of the plate filter (18). The spreader (14) has a spreading device (24*k* 28), which is placed onto sides of the filter folds (16) of the plate filter (18) that are oriented away from a sealing frame (66) of the plate filter (18).

8 Claims, 3 Drawing Sheets

FOREIGN PATENT DOCUMENTS

| | | |
|---|---|---|
| DE | 102 46 057 | 4/2004 |
| EP | 0 948 985 | 10/1999 |
| EP | 1 340 591 | 9/2003 |
| GB | 2 393 143 | 3/2004 |
| WO | 2004/039539 | 5/2004 |

* cited by examiner

DUST FILTER DEVICE

CROSS-REFERENCE

The invention described and claimed hereinbelow is also described in PCT/EP2007/053823, filed on Apr. 19, 2007 and DE 102006026768.0, filed on filed Jun. 9, 2006. This German Patent Application, whose subject matter is incorporated here by reference, provides the basis for a claim of priority of invention under 35 U.S.C. 119 (a)-(d).

BACKGROUND OF THE INVENTION

The invention is based on a dust filter device, in particular for hand-guided power tools, which comprises a plate filter with filter folds and at least one spreader for spreading the filter folds of the plate filter.

There are already known dust filter devices, in particular for rotary hammers, in which filters are used for dust separation. In order to achieve the greatest possible surface area in the dust separation, filter folds of the filter are situated parallel to one another.

SUMMARY OF THE INVENTION

The invention is based on a dust filter device, in particular for hand-guided power tools.

According to one proposed embodiment, the dust filter device has at least one spreader that is provided for spreading filter folds of a plate filter, thus making it possible to simplify a cleaning of the plate filter and permitting a maximum distance between the filter folds in a given installation space. The distance between the individual filter folds is advantageously increased along a direction starting from a region in which the filter folds are connected to one another and have a common support region, extending outward along the filter folds. In a particularly advantageous embodiment, the dust filter device with spread filter folds is situated in a dust extraction unit of the kind used particularly in hand-guided power tools such as rotary hammers and drills, since this permits achievement of an efficient suction power of the dust extraction unit, primarily with an increasing accretion of dust on the plate filter. In particular, an enlarged distance between the filter folds prevents or inhibits a formation of dust bridges between the individual filter folds in the plate filter through vibrations of the hand-guided power tool, thus making it possible to achieve a uniform accretion of dust on the plate filter.

In addition, plate filters used as permanent filters can advantageously be purged because, thanks to the larger distance between the filter folds, the dust can be easily removed by being tapped out from the plate filter and the dust extraction unit.

According to another proposed embodiment, the spreader has at least one spreading means with at least one partially curved external surface, which makes it easily possible to achieve a spreading of the filter folds of the plate filter. The spreading means in this case can has an inward-oriented and/or outward-oriented curvature.

The spreading means advantageously constitutes a support for the plate filter thus making it possible to achieve a spreading of the filter folds in a structurally simple fashion. In this connection, a sealing frame of the plate filter can rest against the support, with the curved side of the support oriented toward the sealing frame and the plate filter. In this case, it is particularly advantageous if the sealing frame of the plate filter is situated between the curved support and a receptacle cover of a collecting receptacle of the plate filter of the dust extraction unit so that the sealing frame can be pressed against the support by the receptacle cover and the support has a concave curvature at the sealing frame.

It is also advantageously possible to reduce the number of additional components, the space required, the assembly complexity, and costs if at least part of the spreading means is integrally joined to the dust filter device.

In another proposed embodiment of the invention, the spreader has at least one spreading means provided for placement against the filter folds of the plate filter. The spreading means in this case can be fastened to the filter folds of the plate filter, e.g. glued, and/or can be detachably fastened to the filter folds. For example, the spreading means can be integrated into a receptacle wall of a collecting receptacle of the plate filter in that the spreading means has a receiving region for guiding the individual filter folds and is thus able to spread the filter folds.

According to another proposed embodiment, the spreading means is embodied in a comb-like fashion, thus making it possible to achieve a spreading of the filter folds in a structurally simple fashion in that the comb-like spreading means is provided to receive the filter folds. In this case, a distance between the comb-like recesses in the spreading means is greater than a distance between the filter folds of an unspread plate filter. The spreading means here can be attached to the filter folds before the plate filter is inserted into the collecting receptacle of the dust filter device, or can also be fastened to a collecting receptacle bottom. It is also conceivable to embody the comb-like spreading means as integrally joined to the collecting receptacle bottom.

A particularly stable spreading of the filter folds can be achieved if the spreading means is at least partially glued to the filter folds of the plate filter, particularly if the glued-on spreading means is embodied in the form of a spreading comb. Basically, however, it is also always conceivable to use other fastening mechanisms deemed useful by those skilled in the art, for example a clamping of the filter folds in the spreading means.

According to another proposed embodiment, the spreading means is composed of a bead of resin, which makes it possible to achieve a particularly simple and space-saving spreading of the filter folds. Resin is primarily distinguished by its viscous, sticky properties, which allow the resin bead to be simply applied over the sequentially arranged, spread filter folds, without the resin running over the filter folds and flowing between the filter folds, thus making it possible to hold the filter folds in the spread position. Alternatively and/or in addition, the filter folds can always conceivably be spread by using other adhesives and/or bonding agents deemed useful by those skilled in the art.

BRIEF DESCRIPTION OF THE DRAWINGS

Other advantages ensue from the following description of the drawings. The drawings show exemplary embodiments of the invention. The drawings, the description, and the claims contain numerous defining characteristics in combination. Those skilled in the art will also consider the defining characteristics individually and unite them to form other meaningful combinations.

DETAILED DESCRIPTION OF THE EXEMPLARY EMBODIMENTS

Figure 1:
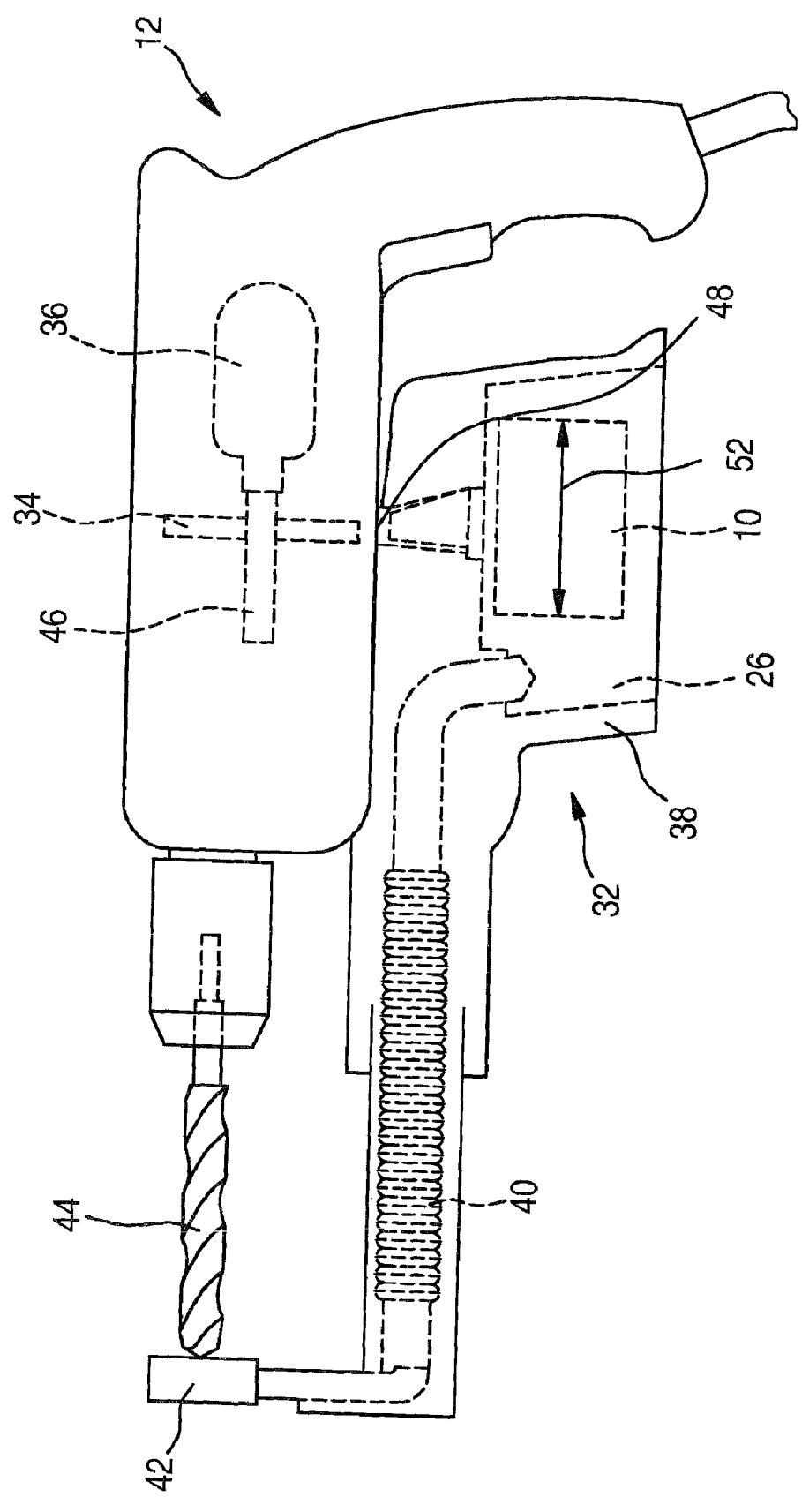
FIG. 1 is a schematic depiction of a hand-guided power tool with a dust filter device.

FIG. 1 shows a hand-guided power tool 12 represented by a rotary hammer. A detachable dust extraction unit 32 is attached to the rotary hammer. The rotary hammer has an additional fan 34 that a drive unit 36 of the rotary hammer drives via a drive shaft 46. The additional fan 34 produces a suction power for the detachable dust extraction unit 32. The detachable dust extraction unit 32 has a suction base unit 38, a variable-length suction arm 40, and, attached to the latter, a suction head 42 that is situated in cylindrical fashion around a drilling tool 44.

The suction base unit 38 has a receiving region for a collecting receptacle 26, a collecting receptacle 26 with a dust filter device 10, and an interface 48 via which the dust extraction unit 32 is coupled to the rotary hammer. By means of a detent connection that is not shown in detail, the collecting receptacle 26 is detachably connected to the suction base unit 38 and can be removed from the suction base unit 38 for cleaning of the collecting receptacle 26. To this end, the collecting receptacle 26 has a closable opening on a transverse side via which dust can be removed and via which the dust can be tapped out from it.

During operation of the rotary hammer and the dust extraction unit 32, the additional fan 34 sucks air and/or dust through the dust extraction unit 32. In this connection, an air suction is generated in the dust extraction unit 32, resulting in a suction of air and/or dust at the suction head 42. The aspirated air and/or aspirated dust travels along the variable suction arm 40 to the suction base unit 38. In the suction base unit 38, the air and/or dust is conveyed through the collecting receptacle 26 and dust particles are separated and/or filtered out at a plate filter 18 of the dust filter device 10. By means of the fan 34 the cleaned air is sucked through a plate filter 18 and travels via the interface 48 to the fan 34 and from there, escapes through ventilation openings that are not shown in detail.

Figure 2:
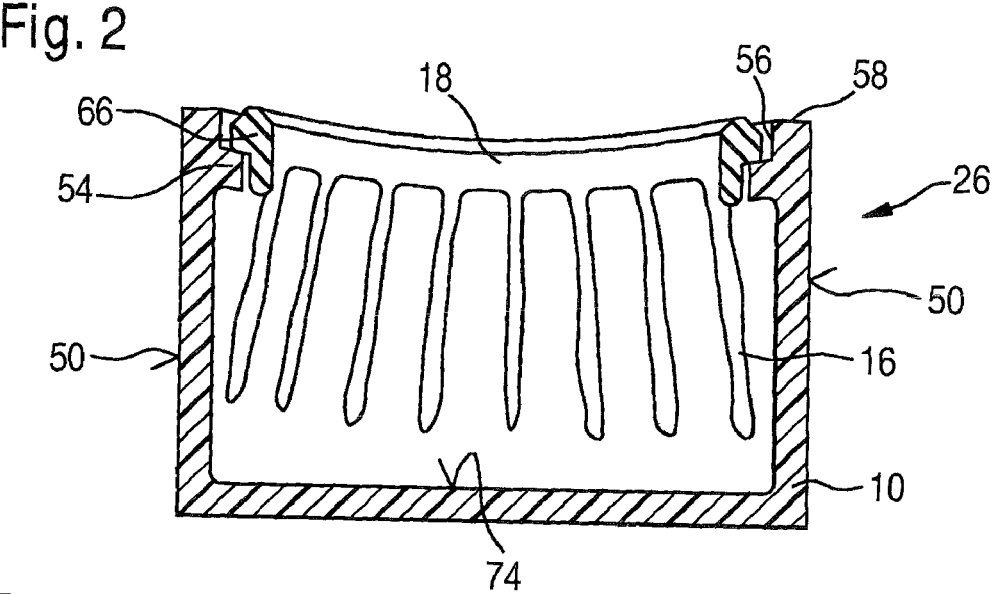
FIG. 2 shows the dust filter device from FIG. 1 with a spread plate filter.

FIG. 2 shows a subregion of the collecting receptacle 26 limited to the suction filter device 10. The suction filter device 10 is block-shaped and includes a spreader 14 and the plate filter 18 with spread filter folds 16. On a side oriented toward the fan 34, the collecting receptacle 26 has two openings, not shown in detail, which are provided for sucking in dust and/or air and for sucking out air via the fan 34 shown in FIG. 1. Side surfaces 50, which are situated along a main axis direction 52 (FIG. 1) of the dust filter device 10 are each provided with two protrusion-like support surfaces 54. The protrusion-like support surfaces 54 are situated in an edge region 56 of the side surfaces 50 oriented toward the opening for air suction.

Figure 3:
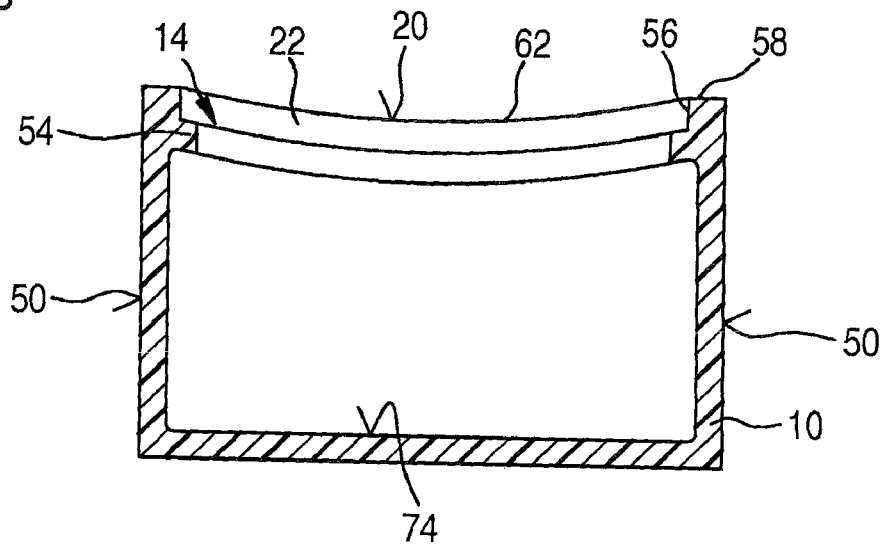
FIG. 3 shows the dust filter device from FIG. 1 with a curved filter support.

The spreader 14 has a spreading means 22 composed of a support that rests against the support surfaces 54 perpendicular to the side surfaces 50 of the dust filter device 10. In addition, the spreading means 22 rests against transverse sides of the dust filter device 10; the transverse sides are oriented perpendicular to the side surfaces 50 and to a side that has the opening. In addition, the spreading means 22 is embodied as integral to the support surfaces 54. The spreading means 22 and the protrusion-like support surfaces 54 are situated on the side surfaces 50 so that the spreading means 22 is flush with an upper edge 58 of the opening provided for air suction (FIG. 3). The spreading means 22 has a concave curvature 62—viewed from the opening—on an outer surface 20 oriented toward the opening and is provided for supporting the plate filter 18.

Figure 4:
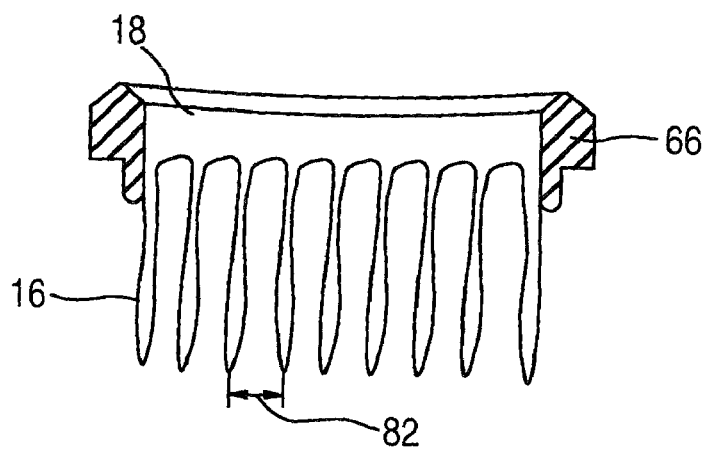
FIG. 4 shows an unspread plate filter.

When the plate filter 18 with parallel filter folds 16 (FIG. 4) or with already-spread filter folds 16 is inserted into the dust filter device 10, the plate filter 18 is inserted through the opening and placed onto the support and onto the protrusion-like support surfaces 54 along the side surfaces 50; the plate filter 18 is first inserted with the filter folds 16 into the dust filter device 10. The support of a sealing frame 66 of the plate filter 18 against the concavely curved support and the protrusion-like support surfaces 54 causes the filter folds 16 of the plate filter 18 to spread (FIG. 2). A distance 82 between the filter folds 16 in the unspread state of the plate filter 18 (FIG. 4) is enlarged by the spreading action in that the distance 82 increases in a direction extending away from the sealing frame 66 of the plate filter 18 along the filter folds 16 (FIG. 2). In addition, when the collecting receptacle 26 is inserted into the dust extraction unit 32, the plate filter 18 and the sealing frame 66 of the plate filter 18 are pressed against the curved support so that an alignment of the plate filter 18 with spread filter folds 16 is particularly stable.

Figure 5:
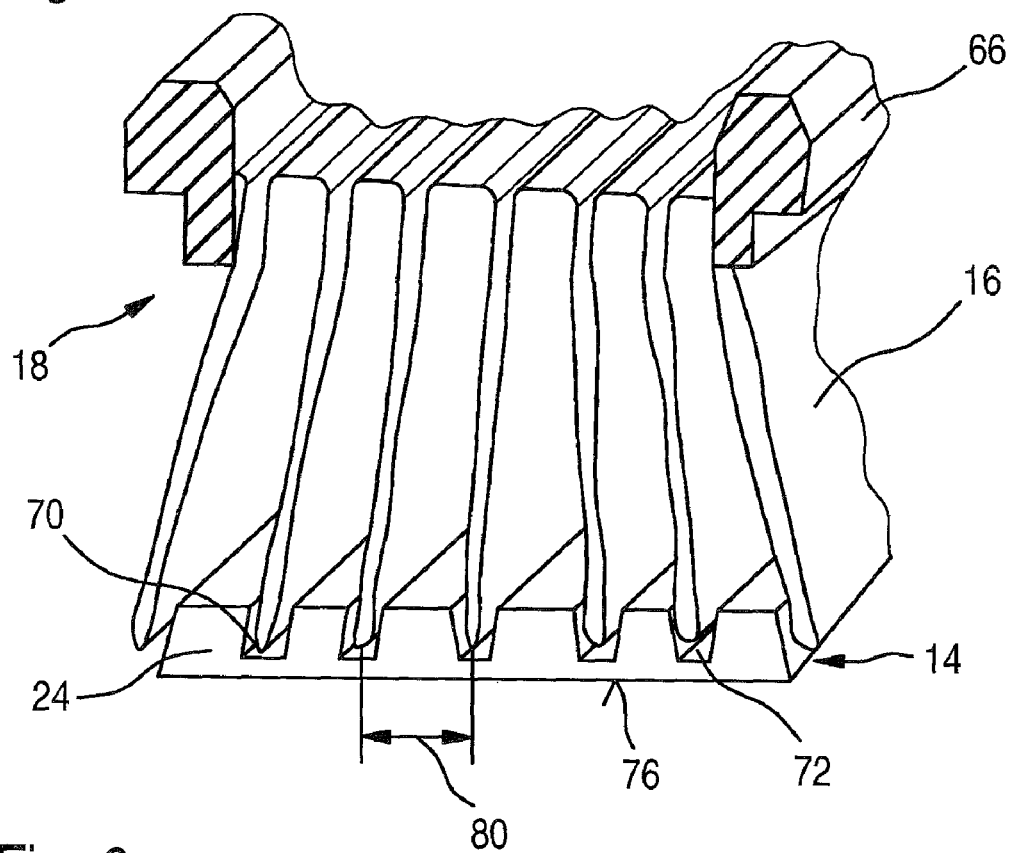
FIG. 5 shows the plate filter from FIG. 4, together with a spreading comb.
Figure 6:
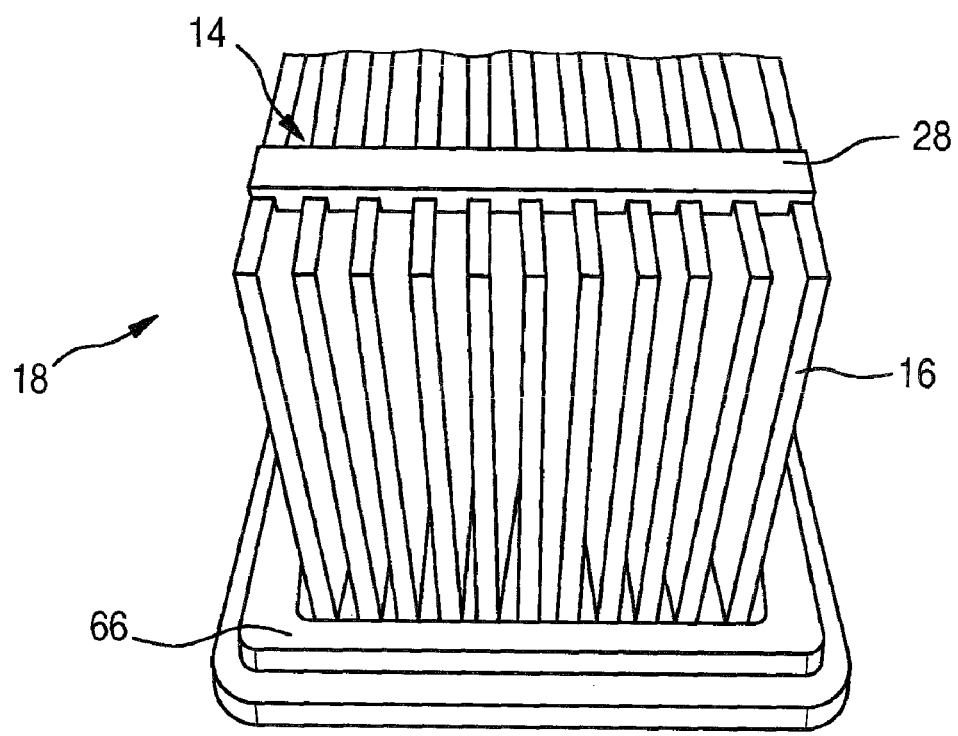
FIG. 6 shows the plate filter from FIG. 4, together with a resin bead.

FIGS. 5 and 6 each show the plate filter 18 with spread filter folds 16 and a spreading means 24, 28 contained in the spreader 14. The spreading means 24, 28 are each situated in the region of the filter folds 16 of the plate filter 18.

FIG. 5 shows the plate filter 18, together with a spreading means 24 composed of a spreading comb that has a receiving region 70 oriented toward one of the filter folds 16 of the plate filter 18. The receiving region 70 of the spreading comb includes a comb-like structure, which is provided with evenly spaced groove-like recesses 72. The recesses 72 are also situated parallel to one another, extending along an orientation of the filter folds 16 of the plate filter 18. A distance 80 between the comb-like recesses 72 (FIG. 5) is greater than the distance 82 between the filter folds 16 in an unspread state (FIG. 4) so that the receiving of the filter folds 16 into the receiving region 70 of the spreading means 24 produces a spreading of the filter folds 16 on a side of the filter folds 16 of the plate filter 18 oriented toward a bottom surface 74 of the dust filter device 10.

In order to prevent the filter folds 16 from coming out of the comb-like receiving region 70, the filter folds 16 of the plate filter 18 and the receiving region 70 of the plate filter 18 are glued to each other. In the installed position of the dust filter device 10, a surface 76 of the spreading comb oriented away from the receiving region 70 rests against the bottom surface 74 of the dust filter device 10, which is perpendicular to the side surface 50.

FIG. 6 shows the filter folds 16 of a plate filter 18, which is held in a spread position with the aid of a spreading means 28 embodied in the form of a resin bead. In this case, viscous resin is applied over the spread filter folds 16 of the plate filter 18 and then hardened. The resin here is applied over sides of the filter folds 16 oriented away from the sealing frame 66 of the plate filter 18 and extends perpendicular to an orientation of the filter surfaces of the filter folds 16. The hardened resin is permanently glued to the filter folds 16 and holds them in the spread position. It is also basically conceivable for the filter folds 16 of the plate filter 18 to be provided with a plurality of spreading means 28 embodied in the form of resin beads.

In another embodiment of the invention deemed useful by those skilled in the art, it is also conceivable to use a combination of a plurality of the spreading means 22, 24, 28 disclosed here, for example a curved filter support together with a resin bead applied to the filter folds 16 and/or together with a spreading means 24 embodied in the form of a spreading comb.

What is claimed is:

1. A dust filter device, in particular for hand-guided power tools (12), comprising:
    a plate filter (18) with filter folds (16) and a sealing frame (66); and
    at least one spreader (14) configured for spreading the filter folds (16) of the plate filter (18),
    wherein the spreader (14) has at least one spreading means (24, 28) configured to be placed onto sides of the filter folds (16) of the plate filter (18) that are oriented away from the sealing frame (66) of the plate filter (18), wherein the spreading means (24) is embodied as a spreading comb comprising a receiving region (70) provided with evenly spaced groove-like recesses (72), wherein the evenly spaced groove-like recesses (72) have a trapezoidal cross section, wherein parallel lateral lengths of the trapezoidal cross section have unequal lengths.

2. The dust filter device at least as recited in claim 1, wherein the spreading means (24) is embodied in a comb-like fashion.

3. The dust filter device at least as recited in claim 1, wherein the spreading means (24, 28) is at least partially glued to the filter folds (16) of the plate filter (18).

4. The dust filter device as recited in claim 1, wherein the spreading means (28) is composed of a resin bead.

5. The dust filter device as recited in claim 1, wherein the evenly spaced groove-like recesses (72) are situated parallel to one another.

6. The dust filter device as recited in claim 1, wherein in each of the evenly spaced groove-like recesses (72) one filter fold (16) of the late filter (18) is guided.

7. A hand-guided power tool (12) in the form of a rotary hammer, comprising:
    a dust filter device, said duster filter device comprising a plate filter (18) with filter folds (16) and a sealing frame (66); and
    at least one spreader (14) configured for spreading the filter folds (16) of the plate filter (18), wherein the spreader (14) has at least one spreading means (24, 28) configured to be placed onto sides of the filter folds (16) of the plate filter (18) that are oriented away from the sealing frame (66) of the plate filter (18), wherein the spreading means (24) is embodied as a spreading comb comprising a receiving region (70) provided with evenly spaced groove-like recesses (72), wherein the evenly spaced groove-like recesses (72) have a trapezoidal cross section, wherein parallel lateral lengths of the trapezoidal cross section have unequal lengths.

8. The dust filter device as recited in claim 4, wherein the resin bead (28) extends perpendicular to an orientation of filter surfaces of the filter folds (16).

* * * * *